US012794092B2

(12) United States Patent
Ko et al.

(10) Patent No.: US 12,794,092 B2
(45) Date of Patent: Nov. 10, 2026

(54) RECHARGEABLE BATTERY

(71) Applicant: SAMSUNG SDI CO., LTD., Yongin-si (KR)

(72) Inventors: Heejung Ko, Yongin-si (KR); Kijung Kim, Yongin-si (KR); Jong-Ha Lee, Yongin-si (KR); Yongjin Park, Yongin-si (KR); Byongchul Woo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 773 days.

(21) Appl. No.: 17/922,952

(22) PCT Filed: Mar. 9, 2021

(86) PCT No.: PCT/KR2021/002867

§ 371 (c)(1),
(2) Date: Nov. 2, 2022

(87) PCT Pub. No.: WO2022/004987

PCT Pub. Date: Jan. 6, 2022

(65) Prior Publication Data

US 2023/0170593 A1 Jun. 1, 2023

(30) Foreign Application Priority Data

Jul. 1, 2020 (KR) ........................ 10-2020-0081159

(51) Int. Cl.
*H01M 50/595* (2021.01)
*H01M 50/109* (2021.01)
(Continued)

(52) U.S. Cl.
CPC ....... *H01M 50/595* (2021.01); *H01M 50/109* (2021.01); *H01M 50/153* (2021.01);
(Continued)

(58) Field of Classification Search
CPC ............. H01M 50/595; H01M 50/181; H01M 50/109; H01M 50/474
See application file for complete search history.

(56) References Cited

U.S. PATENT DOCUMENTS 5,879,832 A 3/1999 Vu et al.
6,443,999 B1 9/2002 Cantave et al.
(Continued)

FOREIGN PATENT DOCUMENTS

CN 104882572 A 9/2015
EP 0246590 A2 11/1987
(Continued)

OTHER PUBLICATIONS

Chinese Office Action, with English translation, dated Jan. 6, 2024, issued in corresponding Chinese Patent Application No. 202180006283.9 (15 pages).

(Continued)

*Primary Examiner* — Kenneth J Douyette
(74) *Attorney, Agent, or Firm* — Womble Bond Dickinson (US) LLP

(57) ABSTRACT

A rechargeable battery according to an exemplary embodiment of the present invention includes: an electrode assembly including a first electrode, a second electrode, and a separator positioned between the first electrode and the second electrode; a case having an internal space accommodating the electrode assembly and an opening with one opened side; a cap plate coupled to the opening of the case and having a terminal hole exposing the internal space; and an electrode terminal electrically connected to the electrode assembly through the terminal hole and overlapping the cap plate, wherein the separator has a greater width than the first electrode and the second electrode, and the separator is in contact with the internal bottom surface of the case.

11 Claims, 6 Drawing Sheets

1002

(51) Int. Cl.

| | |
|---|---|
| ***H01M 50/153*** | (2021.01) |
| ***H01M 50/169*** | (2021.01) |
| ***H01M 50/181*** | (2021.01) |
| ***H01M 50/463*** | (2021.01) |
| ***H01M 50/474*** | (2021.01) |
| ***H01M 50/477*** | (2021.01) |

(52) U.S. Cl.

CPC ....... *H01M 50/169* (2021.01); *H01M 50/181* (2021.01); *H01M 50/463* (2021.01); *H01M 50/474* (2021.01); *H01M 50/477* (2021.01)

(56) References Cited

U.S. PATENT DOCUMENTS

| | | | | |
|---|---|---|---|---|
| 2002/0122975 | A1* | 9/2002 | Spillman ................. | H01M 4/13 429/161 |
| 2003/0047364 | A1* | 3/2003 | Lipman ............... | H01M 50/264 180/68.1 |
| 2004/0038126 | A1 | 2/2004 | Gu | |
| 2006/0257729 | A1* | 11/2006 | Lee ..................... | H01M 50/103 429/61 |
| 2006/0269835 | A1 | 11/2006 | Song | |
| 2013/0059181 | A1 | 3/2013 | LePort et al. | |
| 2014/0128710 | A1* | 5/2014 | Nakamura .......... | H01M 50/216 429/100 |
| 2015/0243940 | A1 | 8/2015 | Kang | |
| 2016/0043378 | A1* | 2/2016 | Guen .................. | H01M 50/553 429/179 |
| 2016/0226099 | A1* | 8/2016 | Azami ............. | H01M 10/0569 |
| 2017/0141023 | A1 | 5/2017 | Arisaka et al. | |
| 2019/0118735 | A1 | 4/2019 | Ota et al. | |

FOREIGN PATENT DOCUMENTS

| | | | |
|---|---|---|---|
| EP | 1266417 | B1 | 11/2008 |
| KR | 20-1998-0062215 | U | 11/1998 |
| KR | 10-2004-0017094 | A | 2/2004 |
| KR | 10-2006-0118955 | A | 11/2006 |
| KR | 10-0686859 | B1 | 2/2007 |

OTHER PUBLICATIONS

Chinese Office Action dated Aug. 31, 2024, issued in corresponding Chinese Patent Application No. 202180006283.9 (7 pages).

EPO Partial Supplementary European Search Report dated Mar. 12, 2025, issued in corresponding European Patent Application No. 21831707.1, 18 pages.

Korean Office Action dated Feb. 13, 2025, issued in corresponding Korean Patent Application No. 10-2020-0081159, 8 pages.

Extended European Search Report issued by EPO on Jun. 3, 2025 for corresponding European Patent Application No. 21831707.1, 14 pages.

* cited by examiner

RECHARGEABLE BATTERY

CROSS-REFERENCE TO RELATED APPLICATIONS

This application is a U.S. National Phase Patent Application of International Application Number PCT/KR2021/002867, filed on Mar. 9, 2021, which claims priority to Korean Patent Application Number 10-2020-0081159, filed on Jul. 1, 2020, the entire content of each of which is incorporated herein by reference.

TECHNICAL FIELD

The present invention relates to a rechargeable battery. More particularly, the present invention relates to an ultra-small rechargeable battery.

BACKGROUND ART

Unlike a primary battery that is incapable of being recharged, a rechargeable battery can be repeatedly charged and discharged. A low capacity rechargeable battery has been used for small electronic devices such as a mobile phone, a laptop computer, and a camcorder, and a large capacity battery has been widely used as a power source for driving a motor of a hybrid vehicle.

A representative rechargeable battery includes a nickel-cadmium (Ni—Cd) battery, a nickel-metal hydride (Ni-MH) battery, a lithium (Li) battery, and a lithium ion (Li-ion) rechargeable battery. Particularly, the lithium ion secondary battery has a higher operation voltage than the nickel-cadmium battery or the nickel-metal hydride battery that is mainly used as a portable electric equipment power source by about three times. Also, the lithium ion secondary battery is widely used in an aspect that energy density per unit weight is high.

In particular, as a demand for wearable devices such as headphones, earphones, smartwatches, and body-mounted medical devices which use Bluetooth has increased, the need for rechargeable batteries of which energy density is high and is ultra-small has been increasing.

This ultra-small rechargeable battery is small in size, so the capacity difference of the rechargeable battery is large depending on the structure inside the case.

DISCLOSURE

Therefore, the present disclosure is to provide a rechargeable battery that increases the capacity of the rechargeable battery by minimizing the case internal structure of the rechargeable battery.

A rechargeable battery according to an exemplary embodiment of the present invention includes: an electrode assembly including a first electrode, a second electrode, and a separator positioned between the first electrode and the second electrode; a case having an internal space accommodating the electrode assembly and an opening with one opened side; a cap plate coupled to the opening of the case and having a terminal hole exposing the internal space; and an electrode terminal electrically connected to the electrode assembly through the terminal hole and overlapping the cap plate, wherein the separator has a greater width than the first electrode and the second electrode, and the separator is in contact with the internal bottom surface of the case.

A first electrode tab electrically connecting the first electrode and the internal bottom surface of the case, and a second electrode tab electrically connecting the second electrode and the electrode terminal may be further included.

A first tape attached to the lower surface of the second electrode tab in an area larger than the second electrode tab to insulate between the second electrode tab and the electrode assembly, and a second tape attached along the diameter direction external circumferential surface of the electrode assembly and wrapped around the exterior side of the electrode assembly to insulate between the exterior side of the electrode assembly and the inner side of the case may be further included.

An insulating disk positioned between the second electrode tab and the top surface of the electrode assembly and insulating between the electrode terminal and the electrode assembly may be further included.

An insulating washer positioned between the second electrode tab and the cap plate and insulating between the second electrode tab and the cap plate may be further included, and the insulating washer may have a portion that is removed corresponding to the electrode terminal.

The cap plate may be welded to the case, and the cap plate and the case may be made of the same metal.

The electrode terminal may include a flange part covering the terminal hole and overlapping the cap plate, and a protruded part integrally formed with the flange part and protruded from the flange part toward the terminal hole.

The exterior side of the protruded part may have a curved surface and an inclined surface, the distance from the curved surface to the end of the cap plate exposed to the terminal hole is shorter than the distance from the inclined surface to the end of the cap plate exposed to the terminal hole, and the distance from the end of the cap plate exposed to the terminal hole toward the end of the inclined surface may become longer.

A thermal fusion layer positioned between the cap plate and the flange part, and insulating bonding between the cap plate and the flange part may be further included.

The thermal fusion layer may be melted at a predetermined temperature.

In the present invention, without installing an insulating member between the lower surface of the electrode assembly and the case, a rechargeable battery in which a short circuit is prevented between the lower surface of the electrode assembly and the case and a capacity of the rechargeable battery is maximized may be provided.

MODE FOR INVENTION

The present invention will be described more fully hereinafter with reference to the accompanying drawings, in which exemplary embodiments of the invention are shown.

As those skilled in the art would realize, the described embodiments may be modified in various different ways, all without departing from the scope of the present invention.

In addition, unless explicitly described to the contrary, the word "comprise", and variations such as "comprises" or "comprising", will be understood to imply the inclusion of stated elements but not the exclusion of any other elements.

Hereinafter, a rechargeable battery according to an exemplary embodiment is described with reference to accompanying drawings.

A rechargeable battery according to an exemplary embodiment of the present invention as an ultra-small rechargeable battery may be a coin-type battery (a coin cell) or a button-type battery (a button cell), but is not limited thereto, and it may be a cylindrical or pin-type battery.

Here, the coin-type battery or button-type battery is a thin coin or button-shaped battery, and may mean a battery in which a ratio of a height to a diameter (a height/diameter) is 1 or less, but is not limited thereto.

Since the coin cell or the button cell is mainly cylindrical, a horizontal cross-section is circular, but the present invention is not limited thereto, and a horizontal cross-section may be oval or polygonal. In this case, a diameter is determined as a maximum distance of a housing (or a case) exterior circumference based on the horizontal direction of the battery, and a height is determined as a maximum distance (a distance from the flat bottom to the flat top cross-section) based on the vertical direction of the battery.

Figure 1:
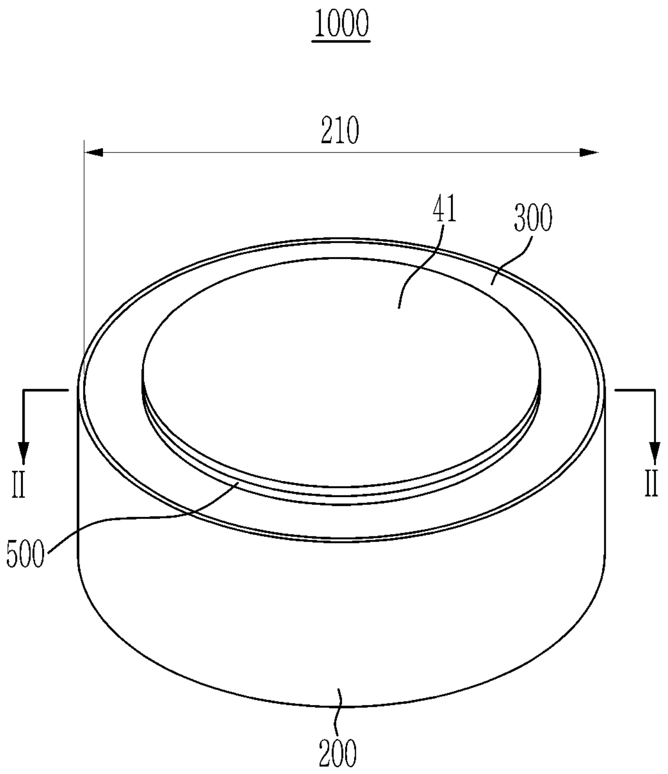
FIG. 1 is a perspective view showing a rechargeable battery according to an exemplary embodiment of the present invention.
Figure 2:
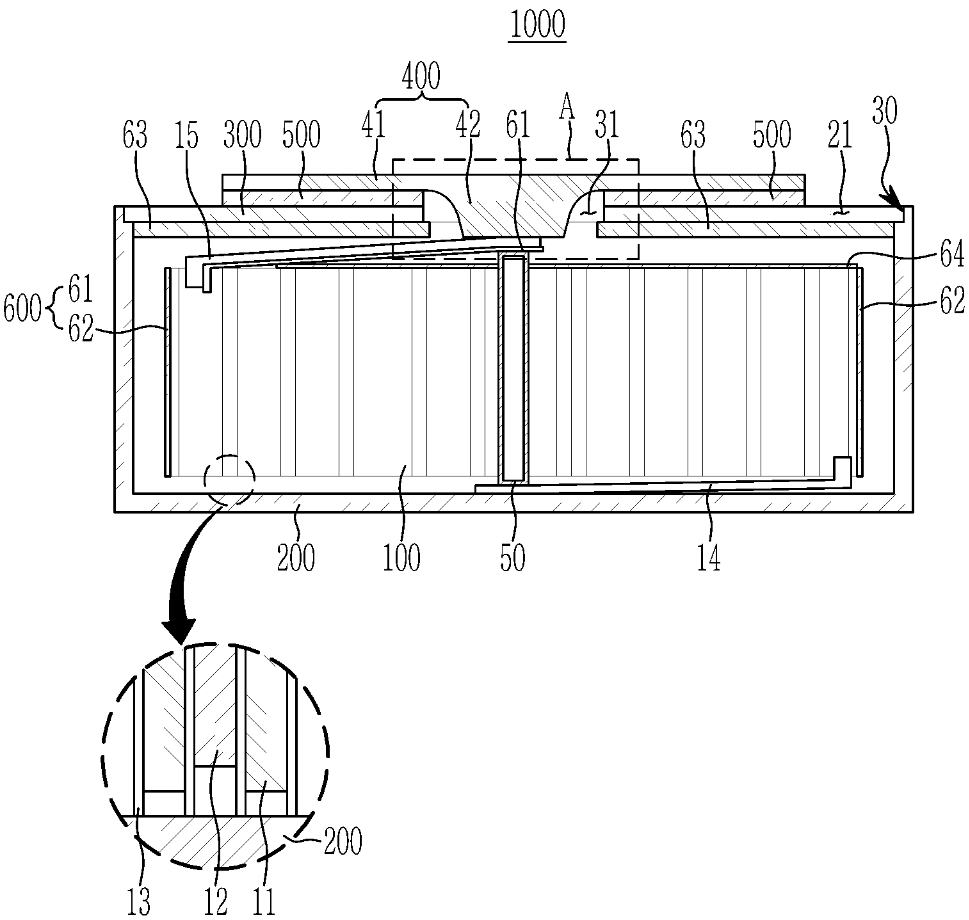
FIG. 2 is a cross-sectional view taken along a line of FIG. 1.
Figure 3:
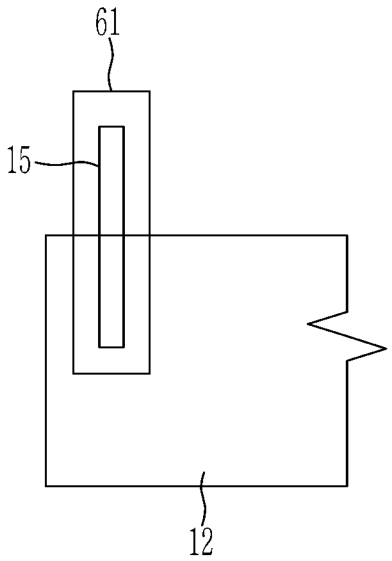
FIG. 3 is a view for explaining an attachment state of a first tape according to an exemplary embodiment of the present invention.

FIG. 1 is a perspective view showing a rechargeable battery according to an exemplary embodiment of the present invention, FIG. 2 is a cross-sectional view taken along a line II-II of FIG. 1, and FIG. 3 is a view for explaining an attachment state of a first tape according to an exemplary embodiment of the present invention.

Referring to FIG. 1 and FIG. 2, a rechargeable battery 1000 according to an exemplary embodiment of the present invention includes an electrode assembly 100, a case 200 having an internal space for receiving the electrode assembly 100, a cap plate 300 coupled to the case 200 and sealing the internal space, and an electrode terminal 400 passing through the cap plate and electrically connected to the electrode assembly 100.

The lower surface of the electrode assembly 100 faces the internal bottom surface of the case 200, and the upper surface of the electrode assembly 100 faces the lower surface of the cap plate 300 covering the opening 21 of the case 200.

The electrode assembly 100 includes a first electrode 11, a second electrode 12, and a separator 13, and the first electrode 11 and the second electrode are positioned on both sides of the separator 13, which is an electrical insulating material, respectively.

The first electrode 11 includes an electrode active region, which is a region to which an active material is applied on a thin plate formed of a metal foil in the shape of a long band and an electrode uncoated region, which is a region to which an active material is not applied, and a first electrode tab 14 may be connected to the electrode uncoated region.

The electrode uncoated region may be formed at opposite ends with respect to the electrode active portion, that is, at both ends in the length direction of the first electrode 11, but is not limited thereto, and it may be formed at one end. The first electrode 11 may be a negative electrode, and an active material such as graphite or carbon may be applied to a metal foil such as copper or nickel for the electrode active region.

The first electrode tab 14 is electrically connected to the electrode uncoated region of the first electrode 11 of the electrode assembly 100, protruded out of the electrode assembly 100, and welded to the bottom surface of the case 200 to electrically connect the first electrode 11 and the case 200. Accordingly, the case 200 connected to the first electrode tab 14 has the same polarity as the first electrode 11.

The second electrode 12 includes an electrode active region where an active material is applied on a thin plate formed of a metal foil in the shape of a long band and an electrode uncoated region where an active material is not applied, and a second electrode tab 15 may be connected to the electrode uncoated region.

The electrode uncoated region may be formed at opposite ends with respect to the electrode active portion, that is, at both ends in the length direction of the second electrode 12, but is not limited thereto, and may be formed at one end.

A second electrode tab 15 may be connected to the electrode uncoated region of the second electrode 12, and the second electrode tab 15 may be protruded from the second electrode 12 to be electrically connected to the electrode terminal 400. The second electrode tab 15 is made of an electrically conductive material such as nickel or copper, and can be connected to the electrode uncoated region by welding. In this case, the welding may be laser welding.

The second electrode 12 may be a positive electrode, and in the electrode active region, an active material such as a transition metal oxide may be coated on a metal foil such as aluminum.

The second electrode tab 15 is electrically connected to the electrode uncoated region of the second electrode 12 of the electrode assembly 100, protruded out of the electrode assembly 100, and welded to the lower surface of the electrode terminal 400 to electrically connect the second electrode 12 and the electrode terminal 400. By the second electrode tab 15, the electrode terminal 400 has the same polarity as the second electrode 12.

The separator 13 is positioned between the first electrode 11 and the second electrode 12, and serves to prevent a short circuit between them and to enable the movement of lithium ions. The separator 13 may be made of, for example, a composite film of polyethylene, polypropylene, polyethylene, and polypropylene.

The width of the separator 13 may be the same as or greater than the width of the first electrode 11 and the second electrode 12, and the width of the first electrode 11 may be greater than the width of the second electrode 12. In this case, the width is the length in the direction in which the electrode assembly is inserted into the case.

Since the length of the separator 13 is relatively longer than that of the first electrode 11 and the second electrode 12, the separator 13 may be in direct contact with the internal bottom surface of the case 200.

In this way, the width of the separator 13 is formed larger than the first electrode 11 or the second electrode 12, so that even if a separate insulating member or insulating plate is not positioned between the electrode assembly 100 and the internal bottom surface of the case 200, it may be prevented that the internal bottom surface of the case 200 electrically connected to the first electrode 11 and the end of the second electrode having a different polarity are in contact with each other to be short-circuited.

Also, when a misalignment of the separator 13 occurs, the first electrode 11, which has a relatively large width, may be protruded out of the separator 13. The first electrode 11 is electrically connected to the case 200 through the first electrode tab 14, and even if the first electrode 11 protrudes out of the separator 13 and is in contact with the case 200, since they have the same polarity, a short circuit phenomenon does not occur.

The electrode assembly 100 may have a jelly-roll shape by being wound around the rotation axis in a state in which the first electrode 11, the separator 13, and the second electrode 12 are overlapped, but is not limited thereto, and it may have a structure in which the first electrode, the separator, and the second electrode of the sheet-type are repeatedly stacked (not shown).

The electrode assembly 100 may be insulated through the insulating tape 600 without contacting the inner surface of the case 200.

The insulating tape 600 includes a first tape 61 attached to the second electrode tab 15 and a second tape 62 surrounding the electrode assembly 100.

The first tape 61 may extend from one end where the second electrode tab 15 is attached to the electrode uncoated region of the second electrode to the other end where the second electrode tab 15 is attached to the electrode terminal 400 (referring to FIG. 3), and may be attached to the lower surface of the second electrode tab 15 with the area wider than the second electrode tab 15.

The first tape 61 prevents the lower surface of the second electrode tab 15 and the end of the first electrode that may be exposed to the upper part of the electrode assembly 100 from being in contact and short-circuited.

The second tape 62 is attached along the diameter direction external circumferential surface of the electrode assembly 100 to cover the exterior side of the electrode assembly 100. The second tape 62 electrically insulates between the external circumferential surface of the electrode assembly 100 and the inner surface of the case 200 while protecting the outside of the electrode assembly 100.

An insulating washer 63 may be further installed between the upper surface of the second lead tab 15 and the cap plate 300 to prevent the second lead tab 15 or the second electrode 12 and the lower surface of the cap plate 300 from being in contact with each other and short-circuiting.

The insulating washer 63 overlaps the edge of the electrode assembly 100 and is positioned on the upper surface of the second electrode tab 15 exposed toward the cap plate 300. Since the electrode terminal 400 is connected to the second lead cap 15, the central portion of the insulating washer 63 corresponding to the electrode terminal 400 may be removed to expose the center (or a center pin) of the electrode assembly.

In addition, on one side of the electrode assembly 100 adjacent to the cap plate 300, an insulating disk 64 may be further installed in order to prevent the end of the first electrode 11 and the electrode terminal 400 from being short-circuited by contacting each other. The insulating disk 64 may overlap most of the top surface of the electrode assembly 100.

A center pin 50 penetrating the center of the electrode assembly 100 in a vertical direction may be positioned at the center of the electrode assembly 100, and the center pin may support the first electrode tab 14 and the second electrode tab 15.

The case 200 has a space in which the electrode assembly 100 and the electrolyte solution are accommodated, has an opening 21 with one side open, and the electrode assembly 100 is inserted through the opening 21 to be accommodated in the internal space of the case 200. The case 200 may have a cylindrical shape with a low height, but is not limited thereto and may have various well-known shapes. The case 200 may accommodate a variety of known electrolyte solutions together with the electrode assembly 100, and the case 200 may be made of stainless steel.

The internal bottom surface of the case 200 is connected to the first electrode 11 of the electrode assembly 100 by the first electrode tab 14, and the case 200 has the same polarity as the first electrode 11.

The outer surface of the case 200 may be the first electrode terminal of the rechargeable battery 1000, and the outer surface of the electrode terminal 400 may be the second electrode terminal of the rechargeable battery 1000.

The cap plate 300 and the electrode terminal 400 that close and seal the internal space of the case 200 may be coupled to the opening 21 of the case 200, and the cap plate 300 may be coupled to the opening 21 by welding.

The cap plate 300 is formed in a shape corresponding to the opening 21, and a step part 30 may be formed in the opening 21 so that the cap plate 300 may be easily seated.

A terminal hole 31 is formed in the center of the cap plate 300, and the terminal hole 31 corresponds to the center of the electrode assembly 100 and exposes an upper portion of the electrode assembly 100. The cap plate 300 has a ring shape due to the terminal hole 31 formed in the center.

The cap plate 300 is combined with the case 200 and has the same polarity as the first electrode 11, and the outer surface of the cap plate 300 may be the first electrode terminal of the rechargeable battery 1000. The cap plate 300 includes stainless steel, but is not limited thereto, and may include a metal such as aluminum, nickel, and copper.

The electrode terminal 400 may be bonded with a state that is insulated from the cap plate 300 of different polarities and be electrically connected to the second electrode 12 of the electrode assembly through the terminal hole 31 of the cap plate 300. Therefore, the electrode terminal 400 may be the second electrode terminal of the rechargeable battery 1000.

The electrode terminal 400 may include stainless steel, but it is not limited thereto, and it may include a metal such as aluminum, nickel, and copper.

The case 200 and the cap plate 300 may be connected to the first electrode 11, which is the negative electrode, so that the first electrode terminal is the negative terminal, and the electrode terminal 400 is electrically connected to the second electrode 12, which is the positive electrode, so that the second electrode terminal may be the positive terminal.

Meanwhile, the electrode terminal 400 includes a flange part 41 and a protruded part 42, the flange part 41 may have a larger area (or diameter) than the protruded part 42, and the flange part 41 has a thinner thickness than the protruded part 42. The protruded part 42 and the flange part 41 may be integrally formed.

The protruded part 42 of the electrode terminal 400 is inserted into the terminal hole 31 and covers the terminal hole 31 of the cap plate 300 together with the flange part 41 to seal the inside of the case 200. The protruded part 42 of the electrode terminal 400 is electrically connected to the second electrode tab 15 of the electrode assembly 100, and then the electrode terminal 400 has the same polarity as the second electrode 12. The outer surface of the flange part 41 may be the second electrode terminal of the rechargeable battery 1000.

Figure 4:
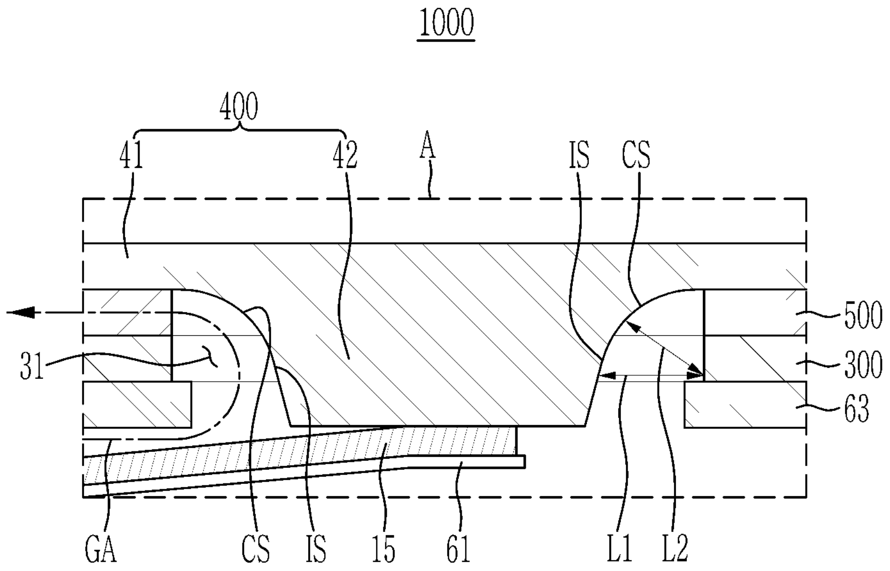
FIG. 4 is a cross-sectional view of a portion A of FIG. 2.

FIG. 4 is a cross-sectional view showing a portion A of FIG. 2.

Referring to FIG. 4, the exterior surface of the protruded part 42 includes a curved surface CS and an inclined surface IS. The protruded part 42 includes a curved surface CS extending from the lower surface of the flange part 41 and an inclined surface IS extending from the curved surface CS and passing through the terminal hole 31.

The curved surface CS may have a predetermined curvature radius, and the inclined surface IS may have a predetermined inclination. Accordingly, the surface of the protruded part 42 moves away from the end of the cap plate 300 exposed through the terminal hole 31 from the curved surface CS toward the end of the inclined surface IS. In this way, if the inclined surface IS is formed, the distance of the protruded part 42 positioned in the horizontal direction between the cap plate 300 and the electrode terminal 400 is increased, and even if an alignment error occurs, the occurrence of a short circuit is suppressed between the cap plate 300 and the protruded part 42 of different polarities.

Again referring to FIG. 1 and FIG. 2, the lower surface of the flange part 41 of the electrode terminal 400 may be attached to one surface of the cap plate 300 through a thermal fusion layer 500. By bonding the thermal fusion layer 500 between the cap plate 300 and the electrode terminal 400, the opening 21 of the case 200 housing the electrode assembly 100 is completely sealed by the cap plate 300, the electrode terminal 400, and the thermal fusion layer 500.

The thermal fusion layer 500 may be thermally fused between the cap plate 300 and the flange part 41 of the electrode terminal 400 by using heat or a laser beam.

The thermal fusion layer 500 is made of an insulating material to insulate between the electrode terminal 400 and the cap plate 300. The thermal fusion layer 500 may include various known materials for insulating and bonding between the cap plate 300 and the electrode terminal 400.

The thermal fusion layer 500 is cured by heat, and may be melted at a predetermined temperature. Here, the predetermined temperature at which the thermal fusion layer 500 melts may be a temperature exceeding the temperature of heat curing of the thermal fusion layer 500, but is not limited thereto.

For example, the thermal fusion layer 500 may include a thermosetting resin and a thermoplastic resin. The thermosetting resin and the thermoplastic resin of the thermal fusion layer 500 may be stacked in a plurality of layers, but the present invention is not limited thereto. The thermosetting resin of the thermal fusion layer 500 is cured by heat, and may include various known thermosetting resins such as phenol resin, urea resin, melamine resin, epoxy resin, and polyester resin. The thermoplastic resin of the thermal fusion layer 500 includes a polypropylene resin that melts at a predetermined temperature, but is not limited thereto, and may include a variety of known thermoplastic resins such as polystyrene, polyethylene, and polyvinyl chloride resin.

As such, the thermal fusion layer 500 is melted at a predetermined temperature, and the portion from which the thermal fusion layer 500 is removed becomes a ventilation channel through which a gas is discharged.

When an unintended event (a short circuit of both electrodes, etc.) occurs in the internal space of the rechargeable battery 1000, the temperature rises, the thermal fusion layer 500 melts due to the elevated temperature, and the volume decreases, and the ventilation channel is formed through which a gas GA generated inside the rechargeable battery is discharged to the outside. The internal gas is guided from the internal space of the rechargeable battery 1000 along the curved surface CS of the electrode terminal 400 to the space between the ventilation channel flange part 41 and the cap plate 300 and is quickly discharged to the outside, thereby a risk of explosion of the rechargeable battery 1000 may be suppressed.

Figure 5:
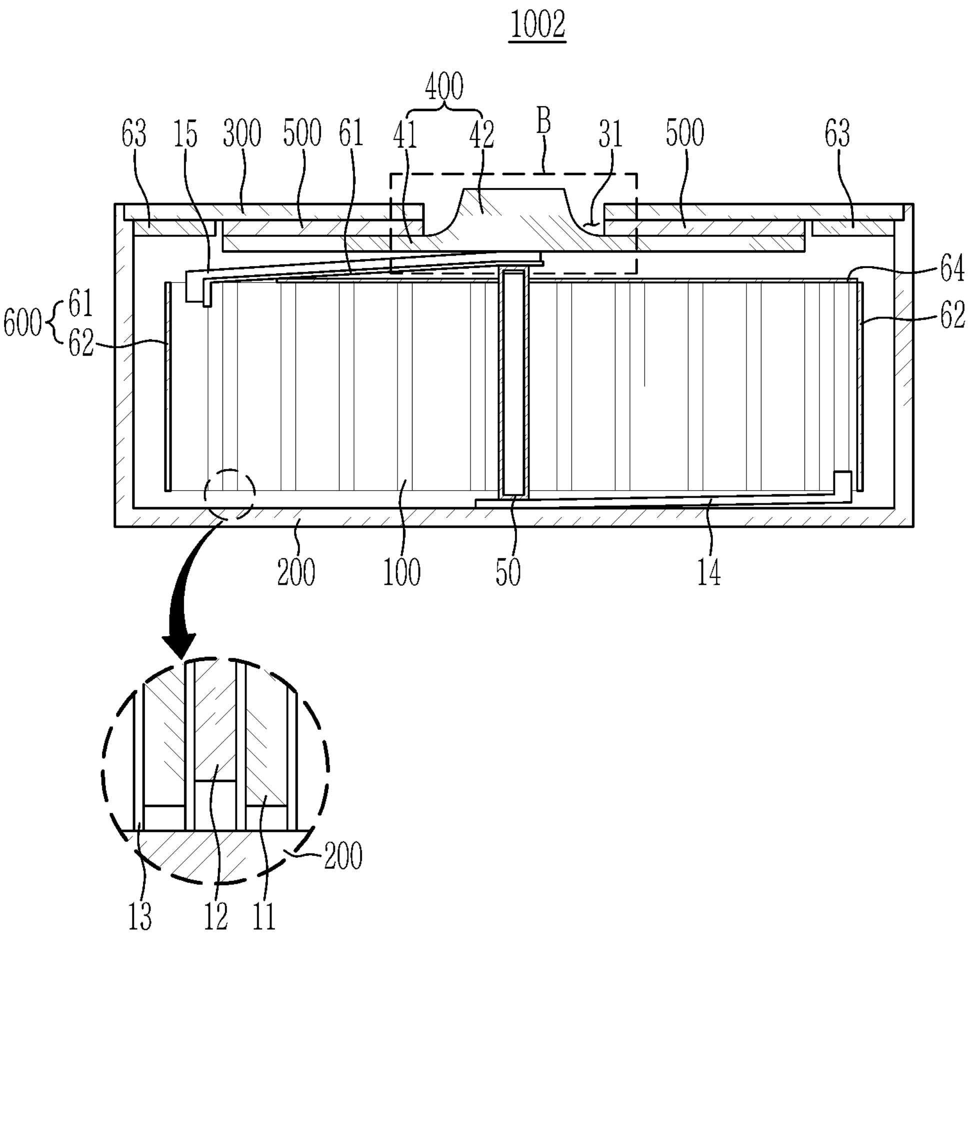
FIG. 5 is a cross-sectional view showing a rechargeable battery according to another exemplary embodiment of the present invention.
Figure 6:
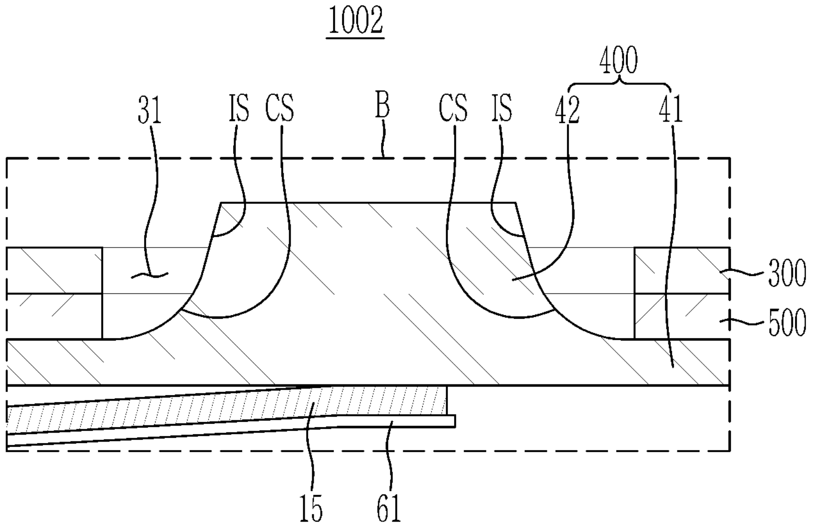
FIG. 6 is a cross-sectional view of a portion B of FIG. 5.

FIG. 5 is a cross-sectional view showing a rechargeable battery according to another exemplary embodiment of the present invention, and FIG. 6 is a cross-sectional view of a portion B of FIG. 5.

The rechargeable battery 1002 according to another exemplary embodiment of the present invention shown in FIG. 5 and FIG. 6 is mostly the same as the rechargeable battery of FIG. 1 to FIG. 3 so that only the other parts are described in detail.

Referring to FIG. 5, the rechargeable battery 1002 according to the other exemplary embodiment of the present invention includes an electrode assembly 100, a case 200, a cap plate 300, an electrode terminal 400, and a thermal fusion layer 500.

The electrode terminal 400 is electrically connected to the second electrode 12, and is insulated and bonded to the cap plate 300 through the thermal fusion layer 500. The electrode terminal 400 covers the terminal hole 31 of the cap plate 300. The electrode terminal 400 is positioned between the cap plate 300 and the electrode assembly 100.

The electrode terminal 400 covers the central area of the opening 21 of the case 200, through which the terminal hole 31 of the cap plate 300 is exposed. As the electrode terminal 400 covers the central area of opening 21 and the cap plate 300 covers the outer area of the opening 21, the opening 21 of the case 200 being completely sealed by the electrode terminal 400 and the cap plate 300. The electrode terminal 400 is connected to the second electrode tab 15 of the electrode assembly 100 and is electrically connected to the second electrode 12 of the electrode assembly 100.

The electrode terminal 400 includes a flange part 41 and a protruded part 42. The flange part 41 is positioned between the cap plate 300 and the electrode assembly 100 in the case 200, and overlaps the cap plate 300 to cover the terminal hole 31.

The upper surface of the flange part 41 is in contact with the thermal fusion layer 500, and the flange part 41 is insulated and joined to the cap plate 300 by the thermal fusion layer 500. A lower surface of the flange portion 41 is electrically connected to the second electrode tab 15

Since the flange part 41 is connected to the second electrode tab 15, the protruded part 42 and the flange part 41 of the electrode terminal 400 have the same polarity as the second electrode 12.

The protruded part 42 penetrates the terminal hole 31 and is exposed outside the case 200. The outer surface of the protruded part 42 may be the second electrode terminal of the rechargeable battery 1002.

The outer surface of the protruded part 42 may be positioned on the same plane as or on a different plane from the external surface of the cap plate 300. For example, the height of the outer surface of the protruded part 42 may be the same as the height of the outer surface of the cap plate 300, however it is not limited thereto, and the height of the outer surface of the protruded part 42 may be higher or lower than the height of the outer surface of the cap plate 300.

The exterior side of the protruded part 42 includes a curved surface CS and an inclined surface IS.

The protruded part 42 includes the curved surface CS extending from the lower surface of the flange part 41 and the inclined surface IS extending from the curved surface CS) and passing through the terminal hole 31.

The curved surface CS may have a predetermined curvature radius, and the inclined surface IS may have a predetermined inclination. Therefore, the surface of the protruded part 42 moves away from the cap plate 300 that is the edge of the terminal hole 31, from the curved surface CS toward the end of the inclined surface IS. In this way, if the inclined surface IS is formed, the distance of the protruded part 42 positioned in the horizontal direction between the cap plate 300 and the electrode terminal 400 is increased, and even if an alignment error occurs, the occurrence of the short circuit between the cap plate 300 and the protruded part 42 of different polarities is suppressed.

In this way, when the flange part 41 is connected through the thermal fusion part 500 within the case 200, if the temperature inside the case 200 rises due to the occurrence of an event and the thermal fusion part 500 melts, the flange part 41 is separated from the cap plate 300 and moves in the direction of gravity, so that the terminal hole 31 may be opened. Therefore, it is possible to prevent an explosion by discharging the internal gas to the outside more quickly than in FIG. 1.

While this invention has been described in connection with what is presently considered to be practical exemplary embodiments, it is to be understood that the invention is not limited to the disclosed embodiments. On the contrary, it is intended to cover various modifications and equivalent arrangements included within the scope of the appended claims.

DESCRIPTION OF SYMBOLS

11: first electrode 12: second electrode
13: separator 30: step part
41: flange part 42: protruded part
100: electrode assembly 200: case
300: cap plate 400: electrode terminal
500: thermal fusion layer

The invention claimed is:

1. A rechargeable battery comprising:
an electrode assembly comprising
a first electrode,
a second electrode, and
a separator between the first electrode and the second electrode;
a case having an internal space accommodating the electrode assembly and an opening defined by one opened side;
a cap plate coupled to the opened side of the case and having a terminal hole exposing the internal space; and
an electrode terminal electrically connected to the electrode assembly through the terminal hole and overlapping the cap plate,
wherein the separator has a greater width than the first electrode and the second electrode, and the separator is in contact with an internal bottom surface of the case; and
wherein an exterior surface of the electrode terminal extending through the cap plate decreases in width from a position linearly aligned with one surface of the cap plate to a position linearly aligned with an opposite surface of the cap plate, the decrease in width of the exterior surface extending through the cap plate being due to a curved and/or an inclined surface of the exterior surface.

2. The rechargeable battery of claim 1, further comprising:
a first electrode tab electrically connecting the first electrode and the internal bottom surface of the case; and
a second electrode tab electrically connecting the second electrode and the electrode terminal.

3. The rechargeable battery of claim 2, further comprising:
a first tape attached to a lower surface of the second electrode tab and having an area larger than the second electrode tab to insulate between the second electrode tab and the electrode assembly; and
a second tape attached along a diameter direction external circumferential surface of the electrode assembly and wrapped around an exterior side of the electrode assembly to insulate between the exterior side of the electrode assembly and an inner side of the case.

4. The rechargeable battery of claim 2, further comprising
an insulating disk between the second electrode tab and a top surface of the electrode assembly and insulating between the electrode terminal and the electrode assembly.

5. The rechargeable battery of claim 2, further comprising
an insulating washer positioned between the second electrode tab and the cap plate and insulating between the second electrode tab and the cap plate,
wherein the insulating washer has an opening corresponding to the electrode terminal.

6. The rechargeable battery of claim 1, wherein
the cap plate is welded to the case, and
the cap plate and the case are made of a same metal.

7. The rechargeable battery of claim 1, wherein the electrode terminal comprises:
a flange part covering the terminal hole and overlapping the cap plate; and
a protruded part integrally formed with the flange part and protruding from the flange part toward the terminal hole.

8. The rechargeable battery of claim 7, further comprising
a thermal fusion layer between the cap plate and the flange part, and insulating bonding between the cap plate and the flange part.

9. The rechargeable battery of claim 8, wherein
the thermal fusion layer is melted at a predetermined temperature.

10. The rechargeable battery of claim 7, wherein the protruded part continuously decreases in width from the flange part to an end of the protruded part.

11. A rechargeable battery comprising:
an electrode assembly comprising
a first electrode,
a second electrode, and
a separator between the first electrode and the second electrode;
a case having an internal space accommodating the electrode assembly and an opening defined by one opened side;
a cap plate coupled to the opened side of the case and having a terminal hole exposing the internal space; and
an electrode terminal electrically connected to the electrode assembly through the terminal hole and overlapping the cap plate,
wherein the separator has a greater width than the first electrode and the second electrode, and the separator is in contact with an internal bottom surface of the case;
wherein the electrode terminal decreases in width from a position linearly aligned with one surface of the cap plate to a position linearly aligned with an opposite surface of the cap plate;
wherein the electrode terminal comprises:
a flange part covering the terminal hole and overlapping the cap plate; and
a protruded part integrally formed with the flange part and protruding from the flange part toward the terminal hole;

wherein an exterior side of the protruded part has a curved surface and an inclined surface, a distance from the curved surface to an end of the cap plate exposed to the terminal hole is shorter than a distance from the inclined surface to the end of the cap plate exposed to the terminal hole; and wherein a distance from the end of the cap plate exposed to the terminal hole to an end of the inclined surface is longer than a distance from the end of the cap plate exposed to the terminal hole to the inclined surface at an area adjacent to the curved surface.

* * * * *